United States Patent [19]

Lakatos et al.

[11] 4,419,575

[45] Dec. 6, 1983

[54] APPARATUS USEFUL FOR POSITIONING A LIGHT FILTER

[75] Inventors: Edward J. Lakatos, Seymour; Paul C. Talmadge, Ansonia, both of Conn.

[73] Assignee: The Perkin-Elmer Corporation, Norwalk, Conn.

[21] Appl. No.: 269,305

[22] Filed: Jun. 2, 1981

[51] Int. Cl.³ .............................................. G01J 3/00
[52] U.S. Cl. .................................... 250/226; 356/418
[58] Field of Search ................ 356/418, 419; 250/226, 250/339

[56] References Cited

U.S. PATENT DOCUMENTS 3,864,037 2/1975 Johnson .............................. 356/418

Primary Examiner—David C. Nelms
Assistant Examiner—Darwin R. Hostetter
Attorney, Agent, or Firm—S. A. Giarratana; F. L. Masselle; R. A. Hays

[57] ABSTRACT

An apparatus useful for positioning a light filter includes an incrementally stepped motor having the light filter affixed thereto. The apparatus also includes means for detecting a light signal and incrementing the motor in response thereto.

7 Claims, 4 Drawing Figures

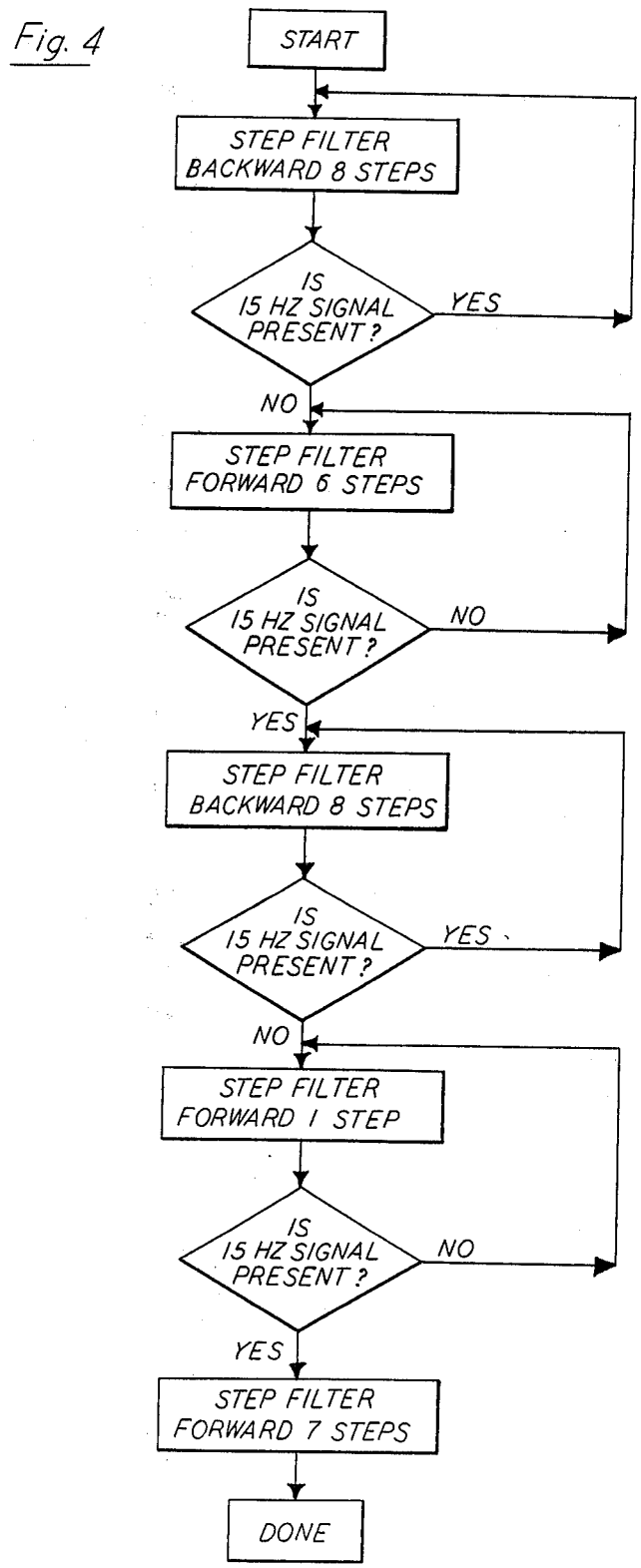

APPARATUS USEFUL FOR POSITIONING A LIGHT FILTER

BACKGROUND OF THE INVENTION

The present invention generally relates to an apparatus useful for positioning a light filter and, in particular, relates to such an apparatus useful for initializing a multi-segment light filter.

In many conventional analytical instruments, information about the sample under test is ascertained by passing a beam of light through the sample and subsequently detecting the relevant frequency spectrum of that light beam. As an example, an infrared spectrometer first passes a beam of light through the sample under test and then through a dispersive optical system, such as a grating, to separate a particular spectral band of interest. The light from the sample is monitored to gather characteristic information about the sample. The light from the sample is generally passed through a frequency sensitive filtering apparatus which removes light of frequencies other than that of interest. The filtered light is then directed onto a detector, commonly of the type which converts the light, based on the intensity thereof, to an electrical signal. The use of a light filtering apparatus is twofold; first, by rejecting light outside of a selected frequency band the signal to noise ratio of the light striking the detector is increased, and second, the character of the sample can be accurately determined by examining the light therefrom through filters having different spectral pass bands.

Hence, in an effort to accurately characterize a sample material, most infrared spectrometers include an apparatus for positioning various light filters, each having a different spectral pass band, in the path of the light beam emanating from the sample. In many instances, the filters are arranged in the form of a segmented wheel where each filter segment has a different spectral pass band. It is, of course, clearly necessary for the analyst or operator to know which filter segment is in the path of the light beam at all times. This information is usually acquired by initially positioning the filter wheel to a known position and thereafter monitoring the controlled rotation thereof. In addition, to ensure that the maximum amount of the light beam to be transmitted through the filter to the detector, it is desirable not only to select the proper filter segment but also to align that segment so as to achieve the maximum light transmission therethrough. Therefore, since the initial positioning of the segmented wheel is used as a basis for all other position setting thereof, it is critical that the initialization of the filter wheel be accurate.

Presently, the conventional instruments rely upon mechanical mechanisms to initially position the filter wheel. For example, in one apparatus, a tab extends from the filter wheel such that as the wheel rotates, the tab activates a switch as it passes thereby. The switching causes the wheel to be braked to position the selected filter between the light beam from the sample and the detector. However, such a mechanical activating system is subject to inaccuracies due to the inherent minor variations in the reaction times of the components due to age, friction, ambient condition or the like.

SUMMARY OF THE INVENTION

Accordingly, it is one object of the present invention to provide an apparatus useful for positioning a light filter.

This object is accomplished, at least in part, by an apparatus including a light signal detector responsively coupled to a filter wheel drive means.

Other objects and advantages of the present invention will become apparent from the following detailed description and the drawing appended hereto.

BRIEF DESCRIPTION OF THE DRAWING

The drawing, which is not drawn to scale, includes the following:

FIG. 4—a flow chart depicting the functions of one of the components of the apparatus.

DETAILED DESCRIPTION OF THE INVENTION

Figure 1:
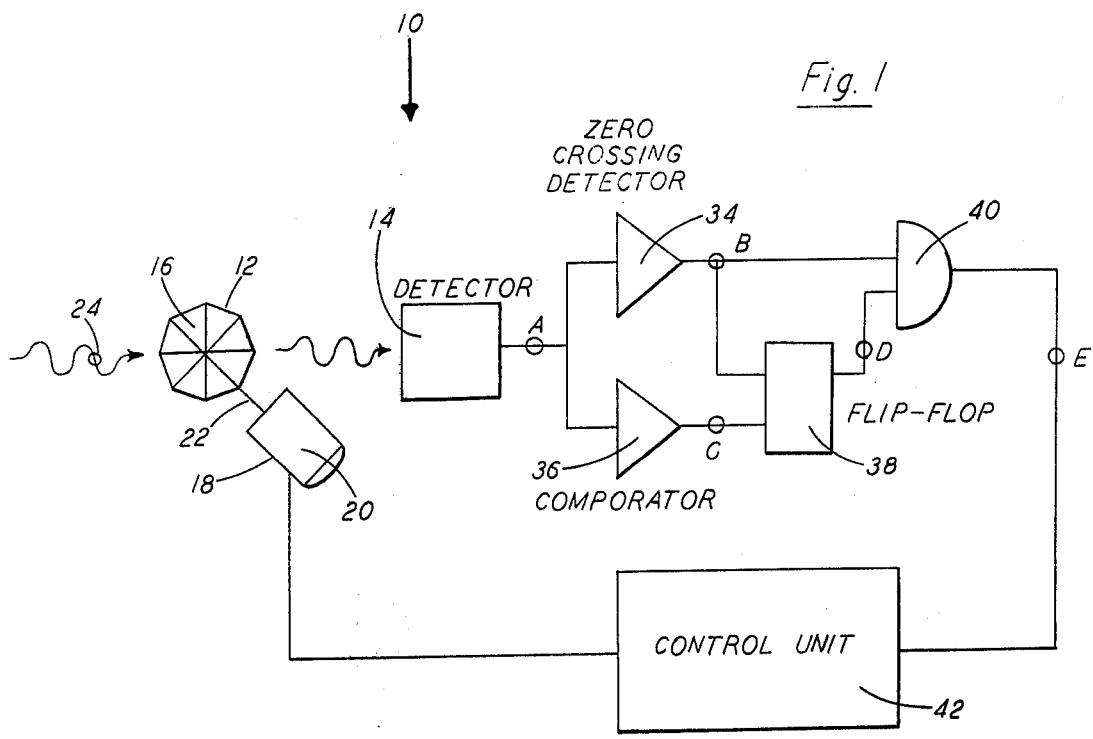
FIG. 1—a block diagram depicting the components of an apparatus embodying the principles of the present invention.

An apparatus useful for positioning a light filter, generally indicated at 10 in the drawing and embodying the principles of the present invention, includes a multi-segment filter 12 interposed between the path of light from a sample material and a detector 14. The apparatus further includes means, responsive to the output of the detector, for controlling the position of the filter 12.

In the preferred embodiment, the multi-segment filter 12 is substantially circular and includes eight equal segments 16. Each segment 16 is preferably a light filter and has a spectral pass band differing from all other segments 16. In this embodiment each segments is somewhat pie-shaped and has an included angle of forty-five degrees (45°). The segments 16 can be retained in their respective positions by any means known in the art, such as a rigid frame, not shown in the drawing. The multi-segment filter 12 is axially affixed to a means 18 for rotating the filter 12.

The means 18 for rotating the filter 12 is a stepper motor 20 which drives a shaft 22 to which the filter 12 is rigidly attached. In one particular embodiment, the stepper motor 20 is selected so as to have 48 steps per revolution, which is 7.5 angular degrees per incremental step. Thus, without ancilliary gearing, each segment 16 traverses a reference point in 6 increments of the motor 20. Preferably, however, to achieve a greater positional control of the filter 12, the angular degrees per incremental step is reduced by either mechanical or electrical means known in the art. It has been determined that a 1:2 reduction, which results in each segment 16 being traversed in 12 increments, provides the desired accuracy.

The multi-segment filter 12 is aligned between an optical signal 24, specifically the light radiation from the sample material, not shown in the drawing, and the detector 14. The filter 12 is positioned such that, when so aligned, substantially all of the light of the pass band spectrum is transmitted through the selected segment 16. It will be understood, however, that for the purpose of initializing the filter 12, a sample material need not be in the light path of the light source, not shown in the drawing, which supplies the beam which is passed through the sample during actual measurement thereof. For reasons more fully explained below, at least one of the segments 16 is chosen to include, in its spectral pass band, a chosen reference frequency, such as a frequency corresponding to 4000 wavenumbers. In addition, the remaining segments 16 are chosen so that light of this frequency is totally rejected.

The detector 14 can be any conventional infrared detector known in the art. For example, the detector 14 could be a thermocouple responsive to temperature changes on the surface thereof due to the impinging infrared signal. Alternatively, the detector 14 could be an optical multiplier which converts an optical signal to an electronic signal. In any event, the detector 14 is one which produces an electronic signal in response to infrared radiation striking the surface thereof. The electronic signal so produced is effectively a square wave having a frequency, or periodicity, representative of the frequency of the presence of radiation striking the detector 14. That is, in most infrared spectrometers the infrared light beam is, for reasons well known in the art, initially passed through a light chopper. Usually, as a result of the light chopping, an infrared beam having a pulse frequency of about 15 pulses per second is produced. Such a pulsed signal is transduced into an electronic signal having a frequency of about 15 Hz by the detector 14.

The electronic signal from the detector 14 carries, during the analytical testing mode of the instrument, characteristic information about the sample material through which it has passed. As shown, in block form, in FIG. 3 the detector signal is amplified by a detector amplifier 26, and the amplified signal therefrom is demodulated by demodulator 28. The demodulated signal is then processed to provide a meaningful output to the user. For instance, the demodulated signal can be processed by a servoamplifier 30, which is connected to a pen servo 32 of a charter recorder. Thus, the result is a graph or chart relating the light intensity of a signal passing through a sample to the frequency of the light. As well known, such a chart provides a particularly convenient presentation of data which characterizes, or identifies, the sample material.

As more fully explained below, the present invention contemplates using the electronic signal for the detector 14 or the detector amplifier 26 as an input signal to a means for controlling the position of the filter wheel 12. Referring particularly to the embodiment shown in FIG. 1, the signal from the detector 14 is preferably provided to both a zero-crossing detector 34 and a comparator 36. The outputs of the zero-crossing detector 34 and the comparator 36 are fed into flip-flop 38, i.e. a pre-biased memory device. The output from the zero-crossing detector 34, as well as the output of the flip-flop 38, serve as inputs to an AND gate 40, the output of which serves as an input to a control unit 42. The control unit 42 can be pre-programmed microprocessor semiconductor device which, as more fully discussed below, controls the position of the filter wheel 12 in response to the output of the AND gate 40.

In reality, when an infrared spectrophotometer is initially switched on, the position of the filter wheel 12 is unknown. That is, the user does not know which segment 16 is in the operative position between the sample light path 24 and the detector 14. However, there is a reference infrared light beam available from the conventional light source. In the preferred embodiment, this light beam has a frequency equivalent of a wavenumber of 4000. As aforestated, only one of the segments 16, the initializing segment, is of a density to allow the transmission therethrough of this signal. Preferably, when the instrument is switched on, and after a suitable time delay to allow for the system to stabilize, the control unit 42 via pulses to the stepper motor 20, causes the filter wheel 12 to rotate. Hence, so long as segments 16 other than the initializing segment are in reference signal path, the detector 14 receives only background radiation.

Figure 2:
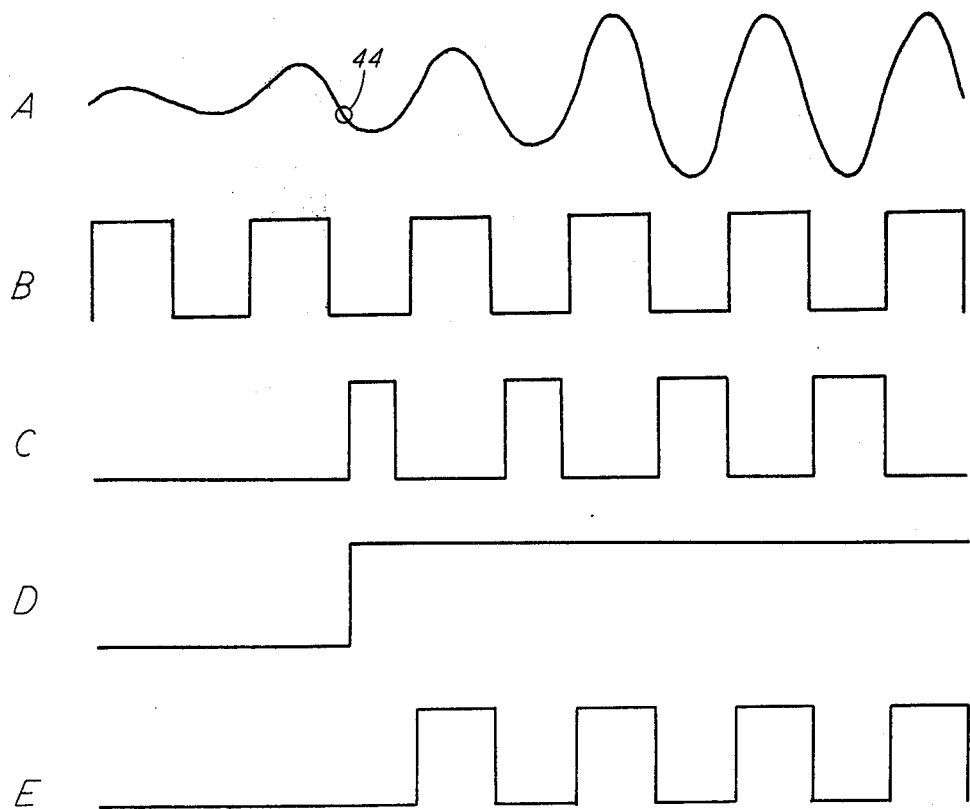
FIG. 2—a time-based signal diagram of representative signals at selected points in the apparatus.

However, when the leading edge of the initializing segment 16 is rotated into the reference beam path, the detector 14 produces an output at point 'A'. The output appears sinusoidal, as shown in FIG. 2, due to the residual response of the detector 14. As previously stated, the output of the detector 14 is provided to a zero-crossing detector 34 and a comparator 36.

The zero-crossing detector 34, in response to the signal from the detector 14, produces a square wave which has the same frequency and phase as the output of the detector 14. That is, when the signal at point A increases from a low value to a high value, i.e. it crosses a preselected "zero", the zero-crossing detector 34 initiates a square-wave pulse which is produced until the signal at point A decreases from a higher value to a lower value, i.e. crossing the same preselected "zero". Upon that zero-crossing, the output of the zero-crossing detector 34 decreases to a preset minimum level, which level is determined by the biasing thereof. Such biasing is well known in the art. In this fashion, a signal represented as 'B' in FIG. 2 is generated and provided to both the AND gate 40 and the flip-flop 38.

The comparator 36, also responsive to the signal from the detector 14, produces a square wave output as well. However, in order to avoid erroneous signals due to background radiation, the comparator 36 is biased so as to produce an output signal at point 'C' only when the amplitude of the detector signal surpasses a preselected level, i.e. a trigger level 44. Thus, as shown by the signal 'C' in FIG. 2, the output of the comparator 36 is initially out of phase with the signal 'B' from the zero-crossing detector 34 but becomes substantially in phase as the amplitude of the detector signal 'A' stabilizes.

As shown in the timing diagram of FIG. 2, the signal 'D', representative of the output of the flip-flop 38, changes from one constant value to a different constant value upon the receipt of a signal from the comparator 34, after receiving a signal from the zero-crossing detector 34. It should be noted that even though the signal 'C' is lagging the signal 'B', the flip flop 38 must nevertheless receive both signals before changing the level of its output, i.e. the signal 'D'. Although the signal 'D' is shown as changing from a lower value to a higher value in response to the zero-crossing detector signal 'B' and the comparator signal 'C', it can, of course, be biased to shift from a higher level to a lower level. In any event, once triggered, the output signal 'D' of the flip-flop 38 is a of a constant amplitude with a zero frequency.

As shown, the signal 'B' from the zero-crossing detector 34, having the same frequency and phase as the signal 'A' from the detector 14, and the signal 'D' from the flip-flop 38, indicative, due to the presence of the comparator signal 'C', of an acceptable signal level above a preselected threshold limit, are provided as inputs to the AND gate 40. Thus, the AND gate 40 produces an output signal 'E' which, upon receiving a signal level change from the flip-flop 38, is equal in frequency and phase with the output of the zero-crossing detector 34. The signal 'E' is provided to a control unit 42.

In the preferred embodiment, the control unit 42 is a preprogrammed microprocessor semiconductor device well known in the electron control art. The control unit 42, upon receiving the signal E from the AND gate 40, stops the rotation of the filter wheel 12. At this instant, the initializing segment 16 is just entering the path of the 4000 wavenumber lightbeam. The control unit 42 next commands, via the stepper motor 20, the filter wheel 12 to be rotated half the number of steps required to cause a filter segment 16 to transit the light path. Upon this rotation, the initializing segment 16 is then positioned so that the light path of the reference beam passes through substantially the center of the segment 16. Thus, the position of the filter wheel 12 is known and is so located that the rotation of the filter wheel 12 by a predetermined number of steps aligns the center of any other filter segment 16 in the sample beam path.

Although the control unit 42 may be substantially implemented by a simple counting device, which upon receiving a signal from the AND gate 40 produces a specific number of command pulses to the servomotor 20, a microprocessor device is preferred since such a device is usually present in modern instruments for other purposes. As any microprocessor device can be used, a generalized flow diagram is presented in FIG. 4. Thus, from the diagram, one skilled in the programming art can easily construct a program to implement the desired functions of the control unit 42. In addition, a particular set of program instructions which is adapted for use with an MC6800 microprocessor to effect the control unit 42 is included herewith as Appendix A. The MC6800 is a microprocessor device manufactured and marketed by Motorola Semiconductor Products, Phoenix, Ariz.

Figure 3:
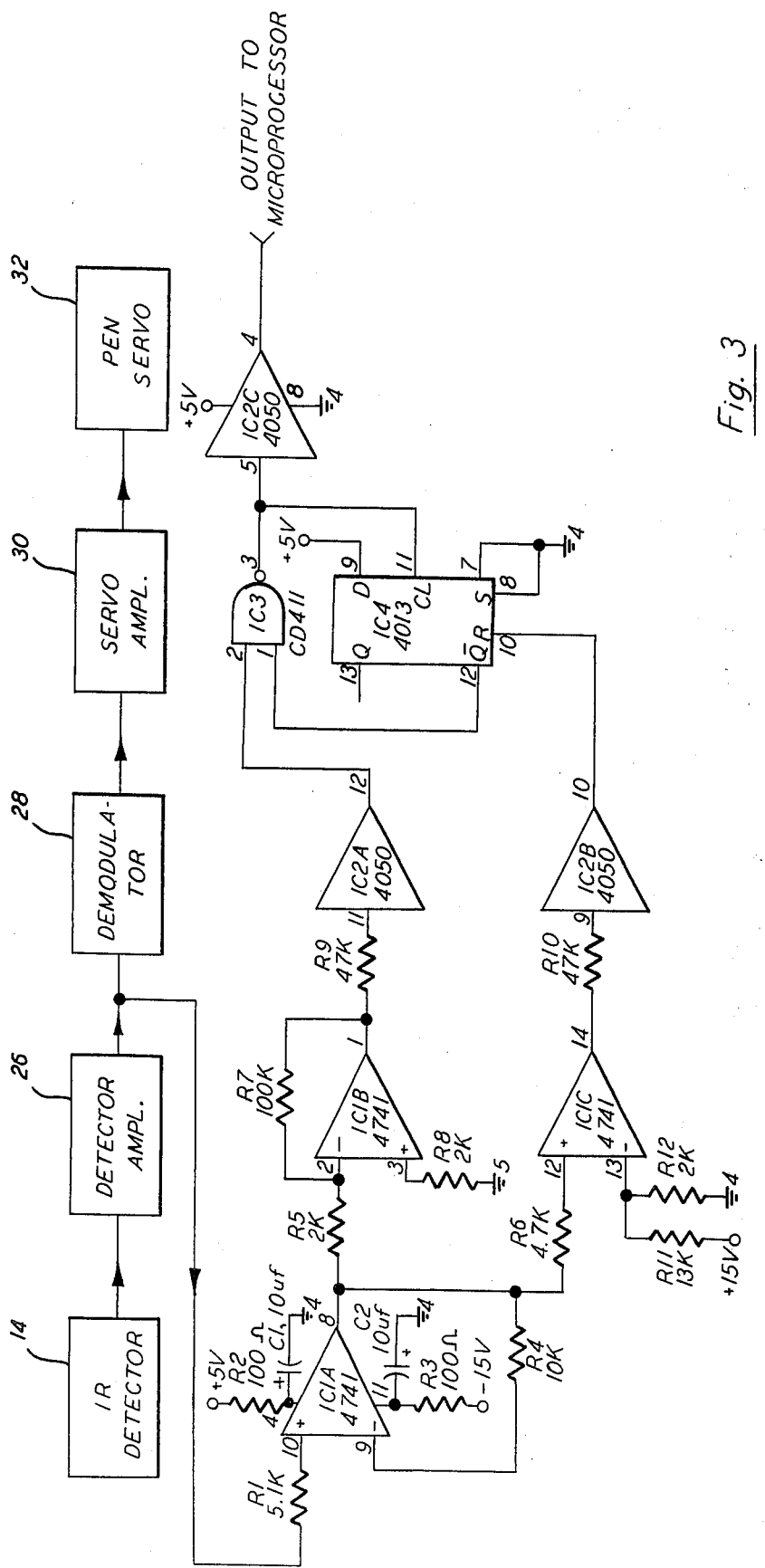
FIG. 3—a circuit diagram of one embodiment of the present invention.

Although the zero-crossing detector 34, the comparator 36, the flip-flop 38 and the AND gate 40 can be implemented by any known means in the art, the configuration shown in FIG. 3 is preferred. The following components can be used to implement the circuit shown:

IC1 is a HA4741 manufactured and marketed by Harris Semiconductor, Melbourne, Fla.
IC2 is an MC14050CP.
IC3 is an MC14011BC; and
IC4 is an MC4013BC.

IC2, IC3 and IC4 are semiconductor devices manufactured and marketed by Motorola Semiconductor Products of Phoenix, Ariz.

While the present specification describes a particular embodiment, numerous variations or alterations can be made without departing from the spirit and scope of the present invention. Hence, the present invention is deemed limited only by the appended claims and the reasonable interpretation thereof.

What is claimed is:

1. An apparatus useful for reproducibly initializing a multi-segment light filter, each discrete segment thereof having a different spectral pass band; said apparatus comprising:
   an optical/electrical transducer responsive to light passing through said filter;
   a reference light beam having a frequency lying in the pass band of only one of said segments, said filter being in the path of said light beam and in front of said transducer, whereby said transducer producing an electrical signal only when said one segment is positioned in said path of said light beam;
   means for moving said light filter in predetermined incremental steps through said path of said reference light beam;
   means, responsive to said electrical signal for substantially instantaneously stopping said movement whereat the leading edge of said one of said segments is positioned in said path of said reference light beam.

2. Apparatus as claimed in claim 1 further comprising:
   means for recognizing said reference light beam from extraneous background radiation.

3. Apparatus as claimed in claim 2 wherein said means for recognizing said reference signal is a comparator having a preset bias and having said electrical signal as an input thereto whereby an output signal is produced only when said electrical signal exceeds the value of said preset bias.

4. Apparatus as claimed in claim 1 or 2 further comprising:
   means, initiated after said stopping means stops said movement, for further moving said light filter such that said one of said segments is substantially centered in said path of said reference light beam.

5. Apparatus as claimed in claim 1 wherein said multisegment light filter is a filter wheel having a plurality of segments.

6. Apparatus as claimed in claim 5 wherein each said segment has the same included angle.

7. Apparatus as claimed in claims 1, 5 or 6 wherein said means for moving said light filter is a stepper motor having said filter affixed to the shaft thereof.

* * * * *